United States Patent [19]

Dunn et al.

[11] 3,974,071

[45] Aug. 10, 1976

[54] WATER CONDITIONING DEVICE

[75] Inventors: Lyman D. Dunn, Chicago, Ill.; John Shields, Terre Haute, Ind.

[73] Assignee: Marlan Company, Chicago, Ill.

[22] Filed: Feb. 26, 1975

[21] Appl. No.: 553,073

Related U.S. Application Data

[63] Continuation of Ser. No. 377,553, July 9, 1973, abandoned.

[52] U.S. Cl. ............................... 210/57; 204/148; 204/197; 210/198 R; 210/501
[51] Int. Cl.² .......................................... C23F 13/00
[58] Field of Search ................ 21/2.7 R; 23/252 A; 204/148, 150, 197, 248, 280, 288, 289; 210/57, 198 R, 501, 220; 252/178; 259/4; 261/79 A

[56] References Cited
UNITED STATES PATENTS

| | | | |
|---|---|---|---|
| 2,805,988 | 9/1957 | Rader | 204/197 X |
| 3,286,992 | 11/1966 | Armeniades et al. | 261/79 A |
| 3,423,294 | 1/1969 | Sephton | 261/79 A |
| 3,448,034 | 6/1969 | Craft et al. | 210/57 X |
| 3,452,966 | 7/1969 | Smolski | 210/220 X |
| 3,486,999 | 12/1969 | Craft | 204/197 |
| 3,835,015 | 9/1974 | Gary | 204/197 |

Primary Examiner—Charles N. Hart
Assistant Examiner—Robert H. Spitzer
Attorney, Agent, or Firm—Coffee and Sweeney

[57] ABSTRACT

A water conditioning device for conditioning the cold water supply to a beverage vending machine. The device uses a spirally twisted strip of corrosion and lime scale inhibiting copper-nickel alloy contained within a cylindrical casing through which the cold water is delivered. The spiral strip churns the water for more complete contact of the water with the strip surfaces as the water flows through the casing.

4 Claims, 3 Drawing Figures

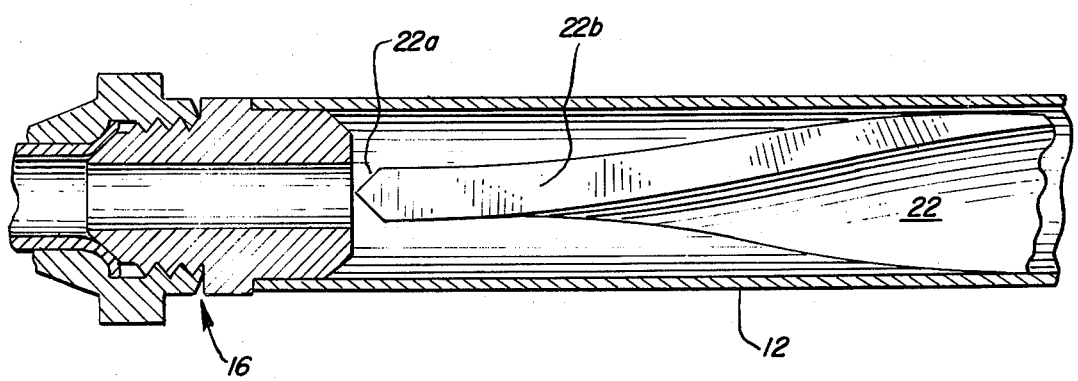
FIG. 1
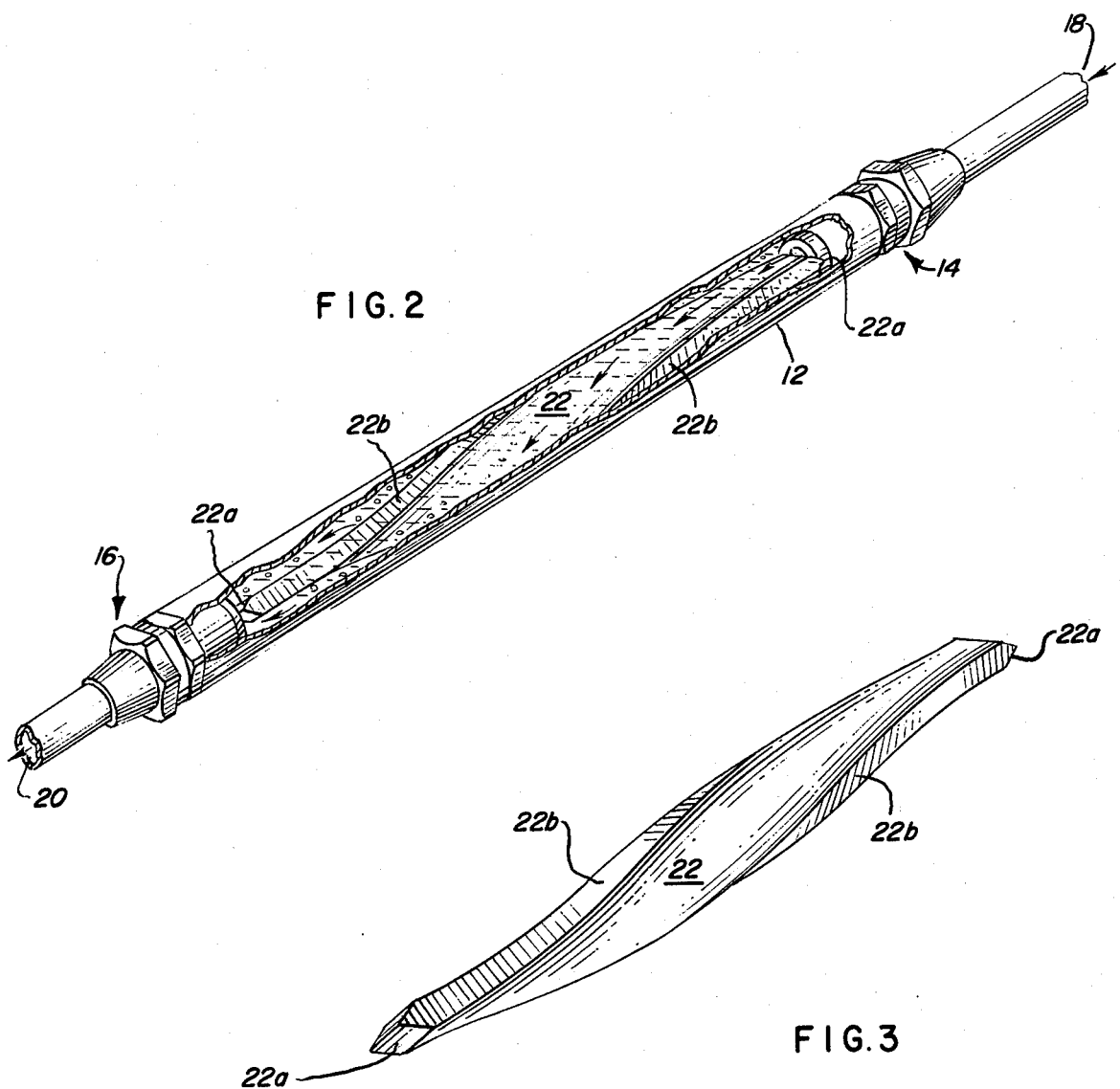
FIG. 2
FIG. 3

WATER CONDITIONING DEVICE

This continuation of application Ser. No. 377,553 filed July 9, 1973, now abandoned.

BACKGROUND OF THE INVENTION

1. Field of the Invention

This invention relates to corrosion and lime scale inhibiting devices using metal alloy corrosion inhibitors and, more particularly, to an improvement in such devices intended for use on cold water inlet lines for beverage vending machines or the like.

2. Brief Description of the Prior Art

Corrosion and lime scale inhibiting devices are currently in use for conditioning inlet water for cold and hot water vending machines. One such device delivers the inlet cold water over the surface of a corrosion inhibitor. The inhibitor is a sand molded bar composed of a corrosion inhibiting metal alloy. For example, the device may use a quarter inch bar sand casting of copper-nickel alloy within a 5/16 inch diameter copper tube as a casing and the water is delivered between the bar and the tube wall. However, as the bar wears down during use, less and less surface area is available for contact with the water so that the efficiency decreases and the element must be replaced.

Other water conditioning systems usually employ filters, screens and/or packed beds which can become clogged by sediment in the water.

SUMMARY OF THE INVENTION

We have found that the efficiency of a corrosion and lime scale inhibitor for use in a water conditioning device can be appreciably improved by providing the inhibitor with an improved configuration and by causing the inhibitor to churn the water as the water flows through the casing. Additionally, the inhibitor has a non-oxidized or "machined" surface in lieu of the oxidized surface of a sand casting. We have found that the activity of the inhibitor thereby is increased. In a special advantageous form of the device, the inhibitor is a spirally twisted strip of the alloy material. The water conditioning device does not require filters which may clog from sediment in the water.

While this invention is susceptible of embodiment in many different forms, there is shown in the drawings and will herein be described in detail a specific embodiment thereof, with the understanding that the present disclosure is to be considered as an exemplification of the principles of the invention and is not intended to limit the invention to the embodiment illustrated.

BRIEF DESCRIPTION OF THE DRAWINGS

FIG. 1 is a perspective view of one form of the device of this invention;

FIG. 2 is an enlarged section along line 1—1 of FIG. 1; and

FIG. 3 is a perspective view of the inhibitor element of the device of FIGS. 1 and 2.

DESCRIPTION OF THE PREFERRED EMBODIMENT

Referring first to FIGS. 1 and 2, the water conditioning device illustrated includes a cylindrical or tubular casing in the form of a copper steel tube 12 having conventional flare fittings 14 and 16 at the ends thereof defining an inlet 18 and an outlet 20. The device can readily be connected into the water supply line in a vending machine for conditioning the water as it flows through the tube 12.

Turning now to FIGS. 2 and 22a tube 12 contains the corrosion and lime scale inhibitor 22 press fit within tube 12 between fittings 14 and 16 and having a transverse nonsymmetrical surface portion for contacting and agitating or churning the water flowing through tube 12 for improved surface contact. In the form shown, the inhibitor is a spiral rigid plate or strip, the spiral surface of which contacts the water. Inhibitor 22 is pointed at the ends to provide end edges 22a for freer flow and to lessen any obstruction to the flow of water through tube 12. In this regard, although the inlet of the device has been identified at 18 and the outlet at 20, the device is completely reversible so that the end at 20 may be used as the inlet and the end at 18 becomes the outlet. In either event, the fittings block discharge of inhibitor 22 from tube 12 under the force of flowing water. Inhibitor 22 is wide and extends across the interior of tube 12 to provide increased surface contact area. As the inhibitor erodes during use, it maintains excellent surface area since the major portion of the erosion takes place at the strip surfaces rather than the edges.

Inhibitors of the type shown in FIG. 3 can be readily manufactured by cutting or otherwise machining from an ingot cast in a metal mold using a suitable release procedure. Preferably, the strips are cut to the desired size from an ingot of special copper-nickel alloy such as a 20 lb. ingot of the nickel and copper alloy obtainable from various sources. In making the specific device illustrated in the drawings, a 5/8 inch copper steel tube was used as tube 12 and the strips were cut to a size 3/32 inch by ½ inch by 5 inches. The strips each are then bent or twisted, as to approximately a 270° spiral (FIG. 3). Inherent in this twisting operation is a cold working and plastic elongation of the strip material which causes the surfaces to become "roughed up" because of the internal shear forces generated by the plastic elongation. These roughed up surfaces provide a very highly erodible surface and additional surface area which causes more efficient erosion when contacted by the water and provides a more efficient inhibitor. The points defining end edges 22a were formed as part of the ingot shape but, alternatively, the points could be provided by sawing or grinding either prior to or after twisting the strips. A strip was then placed in an 8½ inch long tube 12 and conventional fittings 14 and 16 were added. After an inhibitor 22 has been properly shaped, all that is required to complete the assembly of the device is a tube cutter and a flare tool. Thus, it is intended that the inhibitor 22 can be marketed alone, leaving the purchaser to complete installation of the device. No filters are needed so that clogging problems are eliminated.

The special copper-nickel alloy is reported to have substantially the following approximate composition: 65% copper, 4% lead, 1.5% iron, trace of aluminum, trace of phosphorous, 4% tin, 20.5% nickel, 4% zinc and 1% other elements such as chromium. Another suitable alloy is reported to have substantially the following approximate composition: 61.5% copper, 7% lead, 0.4% iron, trace of aluminum, 0.1% phosphorous, 5% tin, 17% nickel and 9% zinc. Usually the copper-nickel alloys will contain lead, tin and zinc in appreciable amounts with small or trace amounts of such other elements as iron, aluminum, phosphorous and chromium. Where percentages are given herein, they are percentages by weight unless otherwise indicated.

We claim:

1. Method of conditioning a stream consisting essentially of water for removal of ingredients which normally form lime deposits, which method comprises the steps of flowing said water through an elongate container having therein a water erodible corrosion and lime scale inhibitor in the form of spiral rigid strip of copper nickel alloy material formed by twisting a flat strip having machined opposing faces which include highly erodible surfaces caused by plastic elongation of the material during twisting which cause contact of the water with said spiral strip so as to churn the water as it flows through said container, preventing movement of said strip relative to the flowing stream of water, said opposing surfaces being fully within the path of flow within the container and said spiral configuration exposing additional surface per length and creating better contact with all water flowing therethrough compared with a solid non-spiral bar of said alloy, and retaining said strip within said container against ejection by the flow of water.

2. A water conditioning device for stabilizing dissolved lime in water comprising a conduit having an inlet and an outlet, a corrosion and lime scale inhibitor in said conduit being a rigid strip of water erodible metal of spiral configuration twisted to the spiral from a flat condition having narrow and wider dimensions and having opposing spiral machined faces, non-oxidized from casting and having highly erodible surfaces caused by plastic elongation of the material during twisting and defining transverse nonsymmetrical surfaces in the path of flow within the conduit for contacting and churning water flowing through the conduit and thereby exposing additional surface per length and creating better contact with all of the water flowing therethrough, and providing free non-filtered flow of water therethrough from the inlet to the outlet, said inhibitor being mounted against movement relative to the conduit and flowing stream of water and means for blocking said inhibitor against discharge from said conduit.

3. The device of claim 2 including fitting means at the inlet and outlet of the conduit and wherein said inhibitor has pointed end edges for decreasing obstruction to flow of water into and out of said conduit.

4. The device of claim 2 wherein said alloy consists essentially of; 65% copper, 47% lead, 1.5% iron, 4% tin, 20.5% nickel, and 4% zinc by weight.

* * * * *